United States Patent
Wone

(10) Patent No.: US 6,393,422 B1
(45) Date of Patent: May 21, 2002

(54) NAVIGATION METHOD FOR DYNAMICALLY GENERATED HTML PAGES

(75) Inventor: May Ngun Wone, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/191,518

(22) Filed: Nov. 13, 1998

(51) Int. Cl.[7] ............................................... G06F 17/30
(52) U.S. Cl. ........................ 707/10; 707/102; 707/3; 707/2; 707/513; 345/738; 345/760
(58) Field of Search .......................... 707/1–10, 102, 707/103, 513; 345/352, 354, 738, 760

(56) References Cited

U.S. PATENT DOCUMENTS

| | | | | |
|---|---|---|---|---|
| 5,276,880 A | * | 1/1994 | Platoff et al. ............... 395/700 |
| 5,423,033 A | * | 6/1995 | Yuen ........................... 395/600 |
| 5,581,663 A | * | 12/1996 | Zlotin et al. ................... 395/51 |
| 5,634,121 A | | 5/1997 | Tracz et al. ................. 395/602 |
| 5,640,558 A | * | 6/1997 | Li ............................... 395/612 |
| 5,706,434 A | | 1/1998 | Kremen et al. ........ 395/200.09 |
| 5,710,900 A | * | 1/1998 | Anand et al. ............... 395/339 |
| 5,710,918 A | | 1/1998 | Lagarde et al. ............. 395/610 |
| 5,724,595 A | | 3/1998 | Gentner ....................... 395/762 |
| 5,737,592 A | | 4/1998 | Nguyen et al. ............. 395/604 |
| 5,745,889 A | | 4/1998 | Burrows ........................ 707/2 |
| 5,745,890 A | | 4/1998 | Burrows ........................ 707/3 |
| 5,745,898 A | | 4/1998 | Burrows ...................... 707/101 |
| 5,745,899 A | | 4/1998 | Burrows ...................... 707/102 |
| 5,745,900 A | | 4/1998 | Burrows ...................... 707/102 |
| 5,748,188 A | | 5/1998 | Hu et al. ..................... 345/326 |
| 5,765,158 A | | 6/1998 | Burrows ...................... 707/101 |
| 5,787,275 A | * | 7/1998 | Li ............................... 395/614 |
| 5,819,282 A | * | 10/1998 | Hooper et al. .............. 707/103 |
| 5,832,452 A | * | 11/1998 | Schneider et al. ............. 705/5 |
| 6,055,541 A | * | 4/2000 | Solecki et al. .............. 707/103 |
| 6,078,924 A | * | 6/2000 | Ainsbury et al. ........... 707/101 |
| 6,131,098 A | * | 10/2000 | Zellweger ................... 707/102 |

* cited by examiner

Primary Examiner—John Breene
Assistant Examiner—Khanh Pham
(74) Attorney, Agent, or Firm—Robert O. Guillot; Oppenheimer Wolff & Donnelly LLP

(57) ABSTRACT

A report navigation method (30a) operating in conjunction with a report generating and viewing method (10) for viewing and navigating between reports (72, 72a) over the internet (16). A request from a browser (14) is sent to a server (12) whereupon a generate reports program (38) in a server (12) creates an intermediate file (44) containing all the necessary data and metadata. When a request from the browser (14) to view the report (72) is sent, a view reports program (60) in the server (12) minimally parses the intermediate file (44) and sends a menu (66) to the browser (14). The user then selects a report from the menu (66) and the server (12) sends the report (72) to the browser (14). URLs (67) are dynamically updated to reflect newly parsed data and further to reflect activity within the method.

6 Claims, 6 Drawing Sheets

NAVIGATION METHOD FOR DYNAMICALLY GENERATED HTML PAGES

COPYRIGHT NOTICE

A portion of the disclosure of the patent document contains material which is subject to copyright protection. The owner, International Business Machines Corporation, has no objection to the facsimile reproduction by any one of the patent disclosure, as it appears in the Patent and Trademark Office patent files of records of any country, but otherwise reserves all rights whatsoever.

RELATED APPLICATIONS

This application is related to a copending application entitled Dynamically Generated HTML Formatted Reports, filed on even date herewith, which is incorporated herein by reference, in its entirety.

1. Technical Field

The present invention relates to the field of computer data communications and more specifically to a method and system for providing dynamically generated Hyper Text Markup Language ("HTML") formatted reports from large amounts of data which is extracted from a Standard Query Language ("SQL") database. The predominant current usage of the present inventive HTML formatted reports navigation method is in the customized generation of, and navigation between, reports over the internet, or like data communications channels.

2. Background Art

One of the uses to which the internet is applied is the querying of data bases which are available over the internet. The accessing of data bases over the internet presents some problems that are not present when a user accesses a data base directly at a local computer. Primary among these is that connection time must be limited over the internet in order to maximize the available bandwidth of the server, internet service provider ("ISP") facilities, network communications means, and the like.

One method that has been used in the prior art to use a common gateway interface ("CGI") program to query the database and to produce a report which is then returned to the requesting user. This method is, however, slow and requires a great deal of processing time. Moreover, once a report is generated it must either be kept in the server's memory (which will require a very great amount of storage space when many such custom reports are generated) or else the entire process will have to be repeated each time such a report is requested.

A copending patent application entitled DYNAMICALLY GENERATED HTML FORMATTED REPORTS teaches a method and system for creating intermediate files which are extracted from a data base to contain only the information needed to generate a particular report or section of reports. This both decreases the delay when such reports are requested (since there is no need to search the entire data base to obtain the information) and decreases the storage capacity required in the server as compared to pregeneration and storage of the required reports. This improvement itself, however, raises several questions about when such reports should be generated, how long (if at all) they should be stored once generated, and how to efficiently navigate between such reports without unnecessarily repeating any of the operations necessary to generate such reports.

It would desirable to have a met hod and system by which the viewing and navigation of such reports over the internet could be improved and/or optimized. However, to the inventor's knowledge no such has existed in the prior art.

DISCLOSURE OF INVENTION

Accordingly, it is an object of the present invention to provide a method for efficiently viewing and navigating between dynamically generated HTML pages.

It is another object of the present invention to provide a method for viewing reports over the internet which requires a minimal amount of repetitive computation.

It is yet another object of the present invention to provide a method for navigating between HTML pages over the internet which will not require excessive storage space in a server.

It is still another object of the present invention to provide a method for viewing and navigating between dynamically generated HTML pages which is simple and easy to use by an end user.

It is yet another object of the present invention to provide a method for viewing and navigating between dynamically generated HTML reports which is flexible such that different types of data can be efficiently retrieved.

Briefly, the inventive method operates within a system wherein the data extraction/processing step is separated from the report formatting step by adding an intermediate step to write the culled data into what is called a 'intermediate files', which use a meta language to describe the data. Then, on demand, a variety of HTML page reports can be dynamically generated by parsing the metadata statements and data from the intermediate files. All subsequent requests to view these reports are dynamically generated from the intermediate files. The metadata statements efficiently describe the data, in that multiple reports may be generated from a set of metadata statements. Such intermediate files require far less storage space in the server than would be required to store pregenerated reports. However, the provision of the intermediate files will greatly enhance performance when a report is requested, since it will not be necessary to query the entire database to obtain the information necessary to generate the report.

According to the present invention, speed of delivery of an initial report is improved by decreasing the parsing required to produce an initial report. Further, speed of delivery of subsequent reports is decreased by minimizing required reparsing of the intermediate files, and navigation between the reports and other resources is made more efficient by dynamically updating URL addresses and/or parameters.

In addition, in the example of the invention described herein, the intermediate files may be parsed either to generate input to a charting facility or to generate input to download Comma Separated Variable ("CSV") file for a table. The file can then be input to other commonly available charting applications or data formatting programs which use the CSV format files.

An advantage of the present invention is that the amount of server storage capacity that is required in order to quickly provide data base reports is reduced.

A further advantage of the present invention is that the speed of producing reports is increased as compared to culling the required data from the data base upon each request therefor.

Still another advantage of the present invention is that data base information from essentially any type of data base can be made available to essentially any desired user over the internet.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s)coded in accordance with the invention.

Figure 1:
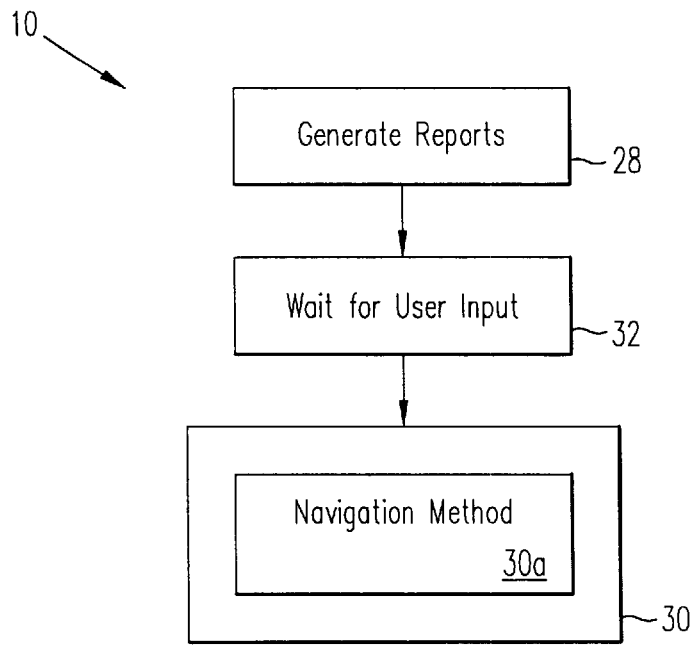
FIG. 1 is a high level flow diagram showing an example of a report generation and viewing method such as that within which the present invention is intended to operate.
Figure 2:
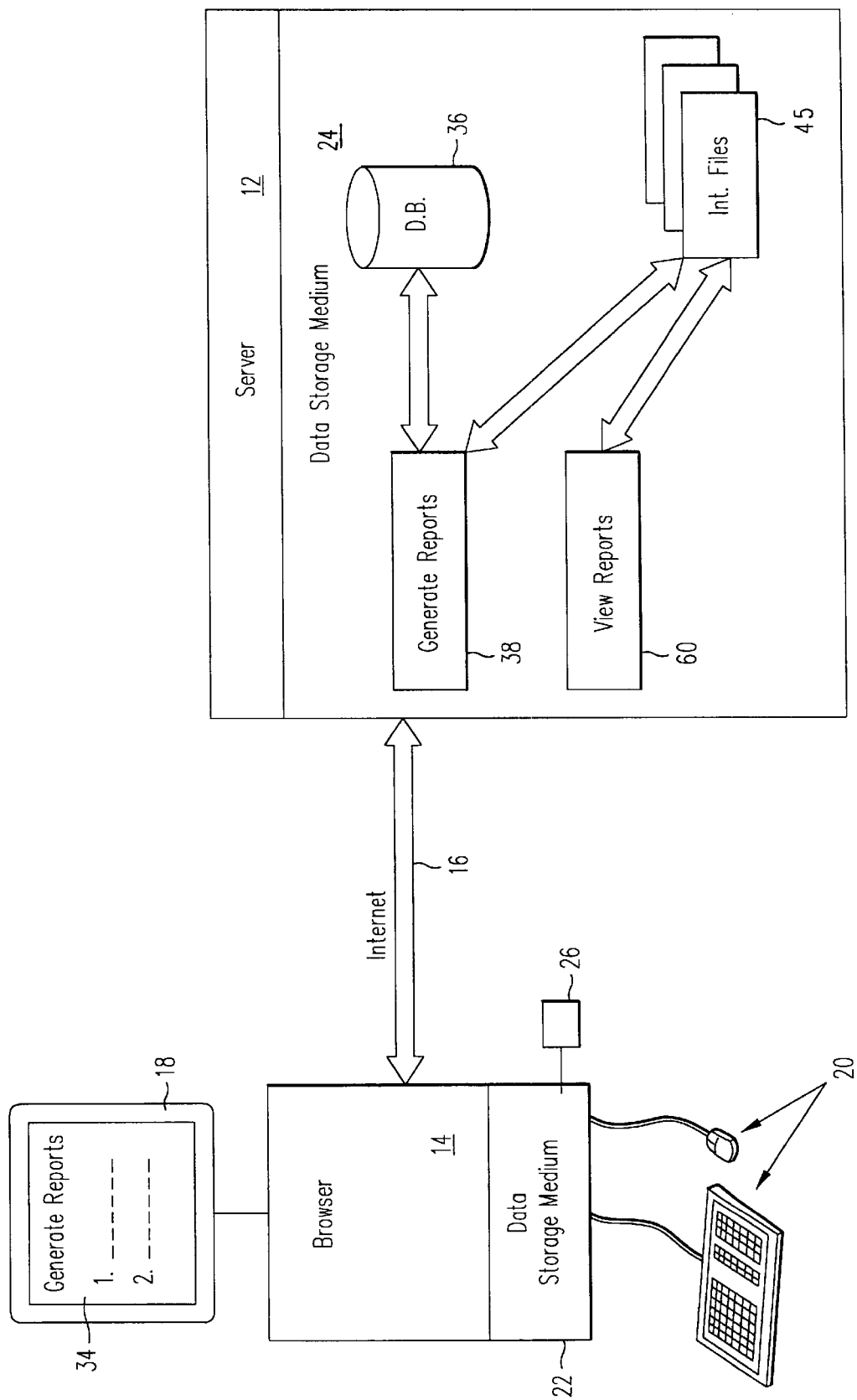
FIG. 2 is a block diagram of an internet/server/browser component arrangement.

FIG. 1 is a flow diagram depicting a report generating and viewing method 10 such as that within which the present invention is intended to function, and FIG. 2 is a block diagram showing relevant portions of the content of a server 12 and browser 14 connected over the internet 16. As shown in the view of FIG. 2, some relevant portions of the browser 14 are a display screen 18 and input devices 20 (generally a keyboard and a mouse). A browser data storage medium 22 will consist of data storage space for containing program code to perform the present inventive functions, and also for containing data used in relation to such operations. The server 12 will generally be similarly appointed and will specifically have a server data storage medium 24 which also will consist of data storage space for containing program code to perform the present inventive functions, and also for containing data used in relation to such operations. Both the browser data storage medium 22 and the server data storage medium 24 may optionally and/or additionally include a removable medium 26 such that the code for performing the present inventive functions and/or data pertaining thereto may thereby be inserted into the browser 22 and server 24 respectively and/or removed therefrom.

As can be seen in the view of FIG. 1, the report generating and viewing method 10 has two basic elements. These are a generate reports operation 28 and a view reports operation 30. According to the present invention, the view reports operation 30 is the inventive navigation method 30a for viewing and navigating between dynamically generated HTML pages. A wait for user input 32 indicates that the generate reports operation 28 need not immediately or automatically be followed by the view reports operation 30. For example, in some cases only certain persons might be authorized to initiate the generate reports operation, while the view reports operation 30 might be accessible to a wider audience. In this regard, it should be noted that the generate reports operation 28 and the view reports operation 30 need not even be accomplished form the same browser 14, and multiple browsers 14 (not shown) might also generally simultaneously initiate the operations described herein. The present inventive method primarily resides within the view reports operation 30, although the generate reports operation 28 will is impacted as will be discussed in more detail hereinafter.

In the generate reports operation 28 (FIG. 1) a user will be presented with an applet (shown, by way of example, as a generate reports menu 34 shown on the display screen 18 of FIG. 2). The applet will be readily customized to a particular application to provide a list of reports available from a particular data base 36 along with an associated HTTP post request which will link to a generate reports program in the server 12. A generated uniform resource locator ("URL"), will have parameters to indicate, to the generate reports program 38, which options have been selected at the browser 14. A simple example of such a URL might be: http://servername/reportgen?&type1

Figure 3:
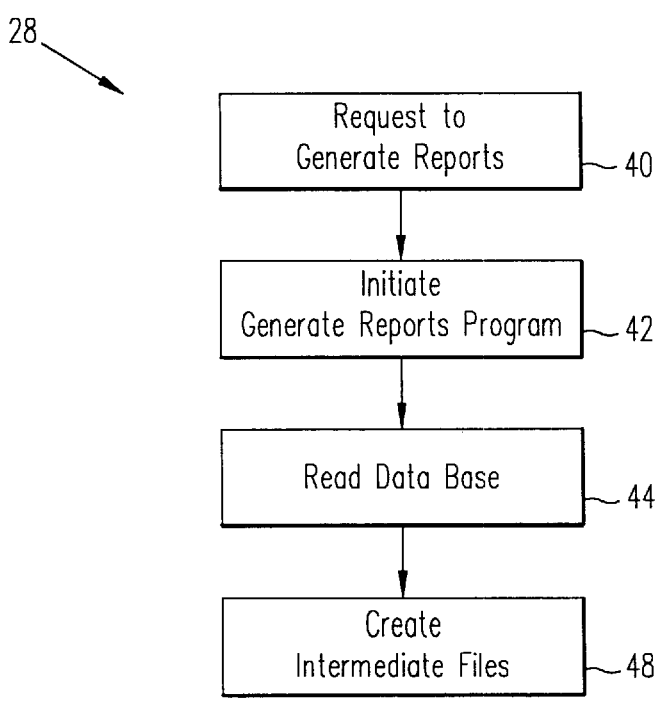
FIG. 3 is a more detailed block diagram showing the operations of the generate reports operation of FIG. 1.

FIG. 3 is a more detailed block diagram showing an example of the subparts of the generate reports operation 28 of FIG. 1. When it is decided by an authorized user that it is desired to produce reports which will then be available to users, the user selects one or more items from the generate reports menu 34 in a request to generate reports operation 40. Thereupon a URL, which is exclusively associated with the particular report(s) desired, is sent from the browser 14 onto the internet 16 and received at the server 12 in an initiate generate reports program operation 42. The generate reports program 38 (FIG. 2) will then read the necessary data from the data base 36 in a read data base operation and then generate one or more intermediate files 46, as will be discussed in more detail hereinafter, in a create intermediate files operation 48. As discussed previously herein in relation to FIG. 1, the intermediate files will then be stored in the data storage medium 24 of the server, awaiting initiation of the view reports operation 30 by a user.

Figure 4:
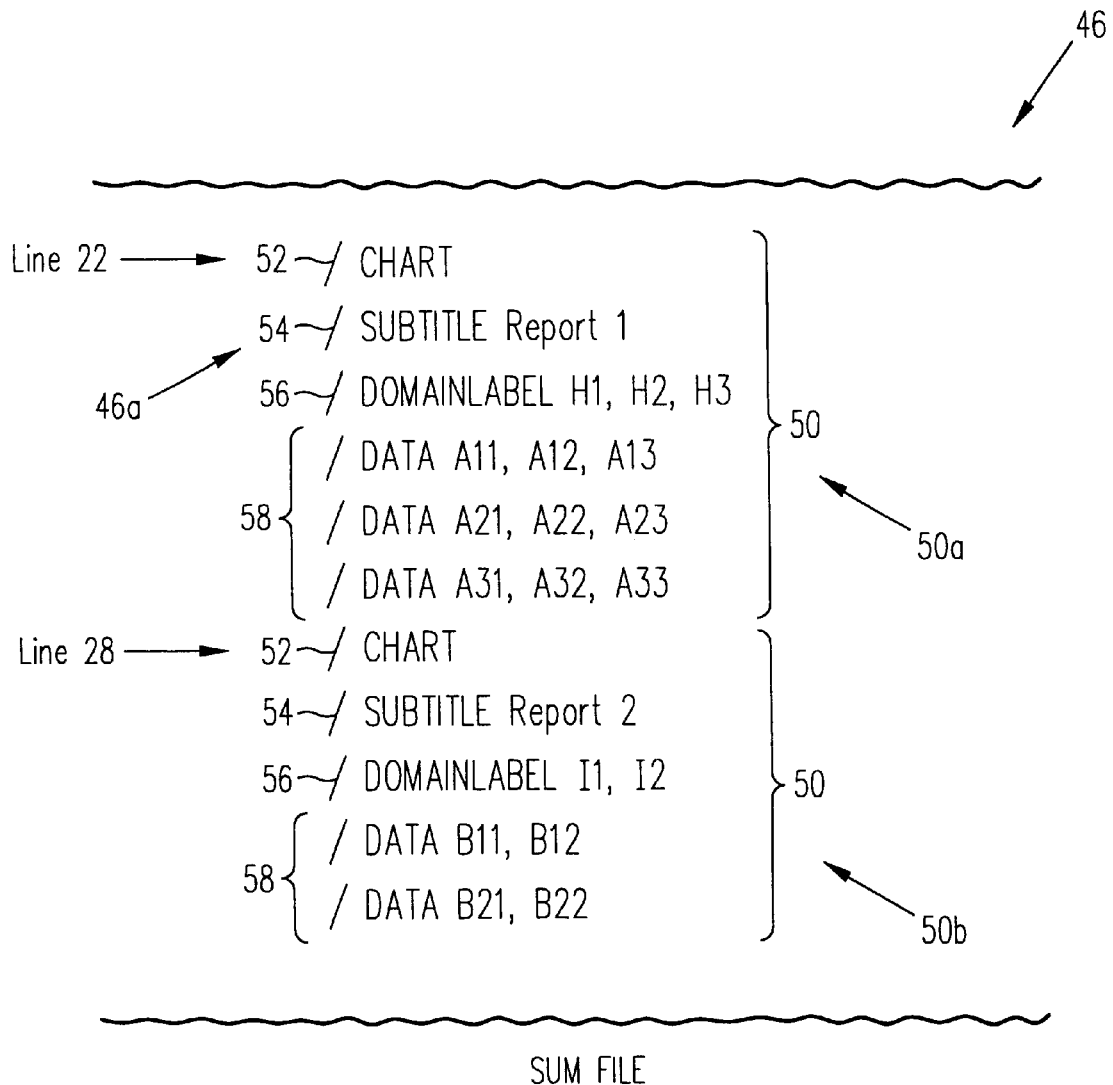
FIG. 4 is an example of the content of a simple intermediate file such as might be used in conjunction with the present invention.

Regarding the format of the intermediate files, FIG. 4 is an example of a simple intermediate file 46. Although this type of file might take any of many forms or formats while remaining within the scope of the invention, the particular format of this example is referred to by the inventors as a SUM file 46a and is identified by the appended by the suffix "SUM". It will be noted that the SUM file includes metadata to define the structure of the data therein. The particular SUM file 46a of this example has two report sections 50 (50a and 50b), each of which is headed by a /CHART entry 52. The /CHART entry serves to allow the generate reports program (FIG. 2) to recognize the beginning of each report section 50. Each report section 50, also has a /SUBTITLE entry 54. It will be noted that, in this example, the subtitles of the two report sections 50a and 50b are "Report 1" and "Report 2", respectively. Each report section 50, also has a /DOMAINLABEL entry 56, which lists domain names that will generally be column headings in a report printout of this data. It will be noted that, in this example, the column headings data for the first report section 50a is H1, H2 and H3. Furthermore, in this example, the column headings data for the second report section 50b is I1 and I2. In actual practice, it is anticipated that such column headings might often be more descriptive of the data that is to be listed in corresponding columns of a printed report.

Each of the report sections 50 also has a plurality of /DATA entry lines 58. In this example, it will be noted that the first report section 50a has three of the /DATA entry lines 58, while the second report section 50b has two of the /DATA entry lines 58. The quantity of the /DATA entry lines will generally correspond to the number of entries in a column under each of the headings of a report. It should be noted that the data shown in this example in each of the /DATA entry lines 58 represents the placement of such data in a printout. That is, for example, A32 is meant to indicate that data in this position will correspond to the third row entry in the second column (under the domain label H2, in this example). In actual practice, it is anticipated that the data in such locations will constitute the information which the user wishes to obtain from the report, rather than merely reciting the position of such data in the report as does the data of this example.

It should be noted that additional lines of Data Entry may readily placed within the intermediate file 46. Indeed, it is anticipated by the inventors that it may be convenient to place lines within the intermediate file 46 so as to make the intermediate file 46 format compatible with other data files that might be used in conjunction with, or in the same environment as this present invention.

Figure 4A:
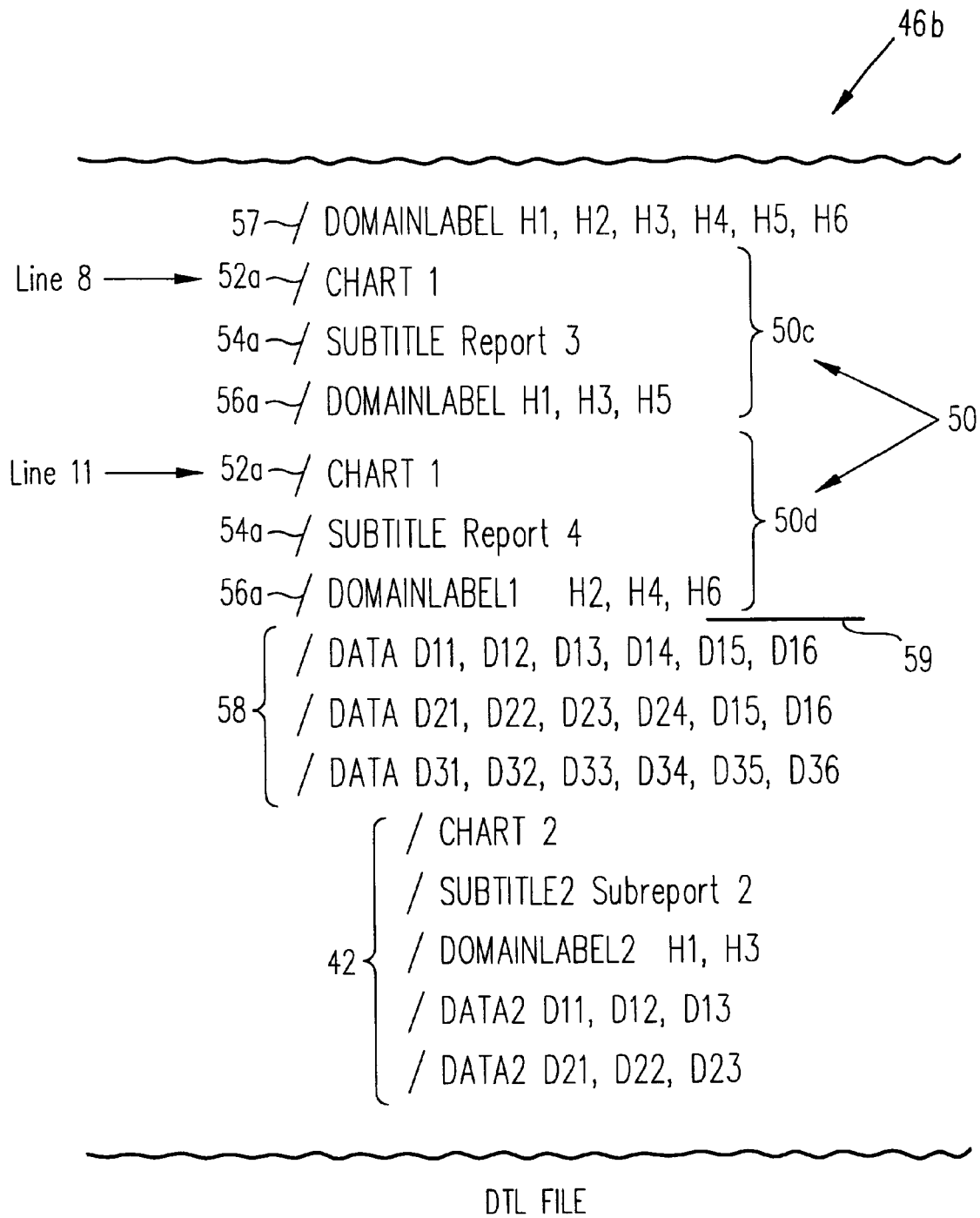
FIG. 4a is an example of the content of an alternate intermediate file according to the present invention.

FIG. 4a is a is an example of an alternate intermediate file 46b such as might be used in conjunction with the present inventive method. Although this type of file might take any of many forms or formats while remaining within the scope of the invention, the particular format of this example is referred to by the inventors as a detail file 46b and is identified by the appended by the suffix "DTL". It will be noted that the DTL file also includes metadata to define the structure of the data therein. The particular DTL file 46b of this example has two report sections 50 (50c and 50d), each of which is headed by a /CHART1 entry 52a. The /CHART1 entry 52a serves to allow the generate reports program (FIG. 2) to recognize the beginning of each report section 50. Each report section 50, also has a /SUBTITLE1 entry 54a. It will be noted that, in this example, the subtitles of the two report sections 50c and 50d are "Report 3" and "Report 4", respectively. Each report section 50, also has a /DOMAINLABEL1 entry 56a, which lists domain names that will generally be column headings in a report printout of this data. It will be noted that, in this example, the column headings data for the report section 50c is H1, H3 and H5. Furthermore, in this example, the column headings data for the report section 50d is H2, H4 and H6. In the DTL file 46b, a master /DOMAINLABEL entry 57 provides all of the headings for which data is provided in this particular example of the DTL file 46b.

In the DTL file 46b, generally following the report sections 50 are a plurality of the /DATA entry lines 58. In this example, it will be noted that the DTL file 46b example has three of the /DATA entry lines 58. It should be noted that a difference between the SUM file 46a discussed previously herein and the DTL file 46b is that the DTL file 46b has only one set of the /DATA entry lines 58 which contains all of the data required to build the reports defined within all of the report sections 50 (50c and 50d, in this example) within the DTL file 46b. As previously discussed herein in relation to the SUM files 46a example of FIG. 4, in actual practice, it is anticipated that the data in the DTL file 46b will constitute the information which the user wishes to obtain from the report, rather than merely reciting the position of such data in the report as does the data of this simple example.

As in the SUM files 46a (FIG. 4), it is anticipated that additional lines of Data Entry may readily placed within the alternate (DTL) intermediate file 46b. Indeed, it is anticipated by the inventors that it may be convenient to place lines within the DTL file 46b so as to make the DTL file 46b format compatible with other data files that might be used in conjunction with, or in the same environment as this present invention.

It is anticipated that, in setting up an iteration of the present invention, a person designing the system will determine which file structure (SUM, DTL, or some other yet to be developed) might be best for the particular type of data base, data, and reports to be viewed. This decision will be made in light of the varying characteristics of these files as will be discussed hereinafter, and further in light of particular requirements of the specific application. It should be noted that the present invention could be practiced entirely with the DTL type files, or some other type of file having the characteristics of the DTL file 46b as discussed herein. The inclusion of the SUM file 46a in this example serves merely to illustrate that some combination of the DTL files with the SUM files, or with some other type of file, is possible within the scope of the invention.

Figure 5:
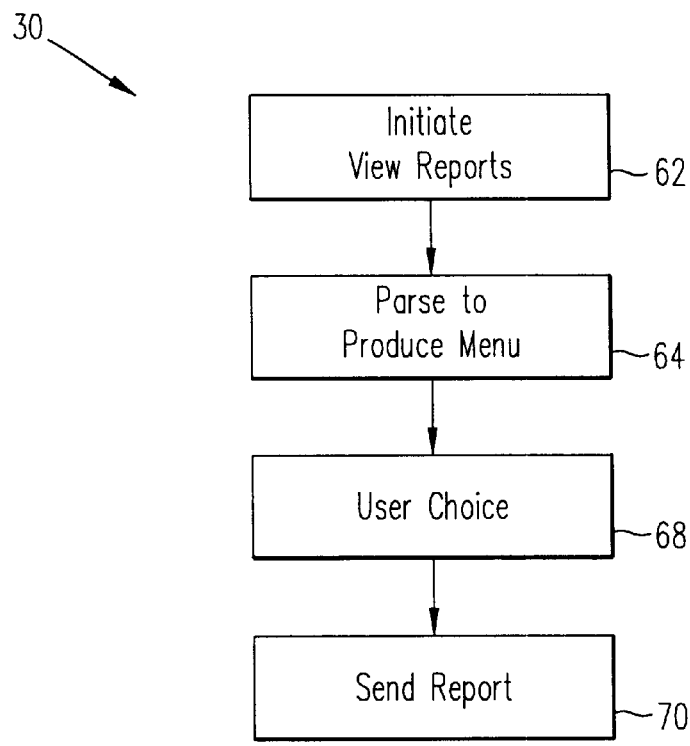
FIG. 5 is a more detailed block diagram showing an example of the subparts of the navigation method operation of FIG. 1.

FIG. 5 is a more detailed block diagram showing an example of the subparts of the inventive navigation method 30a of FIG. 1. When a user wishes to see a report, the user will send to the internet 16 from the browser 14 a URL link to a view reports program 60 (FIG. 2) which, as previously described herein incorporates the navigation method 30a. This is indicated in the view of FIG. 5 as an initiate view reports operation 62. Thereupon the view reports program will parse the intermediate file(s) 44 (in this example, the SUM file 46a of FIG. 4 and the DTL file 46b of FIG. 4a) to obtain the data required to produce a menu in a parse to produce menu operation 64. In this example, it will be noted that because of the structure of the SUM file 46a, the entire SUM file 46a is parsed to get the necessary information. However, because of the structure of the DTL file 46b (FIG. 4a) it is necessary only to parse down to a first parse point 59 to obtain the necessary information (which will be discussed hereinafter). The view reports program 60 will recognize that it has parsed far enough to produce a menu (in this example of the DTL file type) when it encounters the first /DATA entry 58.

Figure 6:
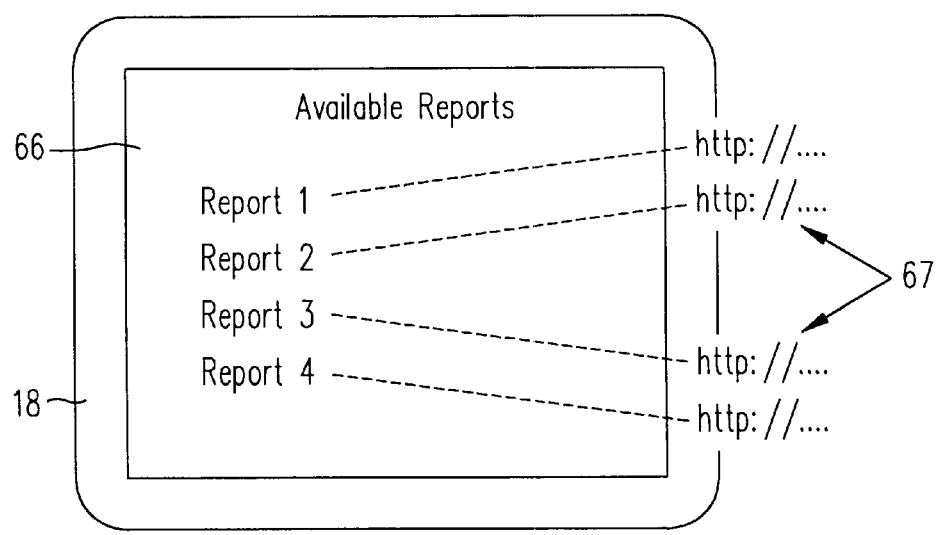
FIG. 6 is a simple example of a menu according to the present invention.

FIG. 6 is an example of a simple menu 66 shown on the display screen 18. Each entry of the menu 66 will have an example of a URL 67 which is associated with each of the available reports (that is, reports produced according to the metadata and data of the intermediate file 50, in this example). Using conventional browser functions, when the user clicks on a choice (in this example, either Report1, Report2, Report3 or Report4) the corresponding URL is sent over the internet 16 and received at the server 12 in a user choice operation 68. Whereupon, in this example, a string readable by the browser to create the desired report in HTML format is sent over the internet 16 to the browser 14 in a send report operation 70, although it is within the scope of the invention that the report could be fully constructed at the server and sent therefrom already in HTML format. It should be noted that, in this example of the present invention, communications from the server 12 to the browser are sent as a data string along with an identifier as to MIME type. Conventional browsers (or specialized programs as may developed for particular applications of the invention) will convert the string to HTML code for display.

By way of example, the URL 67 associated with menu item "Report3" in the present example might be:

http://servername/viewreports&DT=DTL&POSIX=8,11, 22,28&POS=8&RDL=RptSw&Page=0&X_RPT_FILE_NAME=XXX&DC=-1,-1,3,2 where "viewreports" is the exclusive URL of the view reports program; &DT is a passed parameter indicating the type of intermediate file (DTL in this example); &POSIX is a passed parameter indicating the starting line numbers in the intermediate files (46a and 46b) for the reports listed in the index 66; &POS is a passed parameter indicating the line number for the particular table to be displayed (Report3, in this example); and &RDL is a passed parameter indicating a report definition list, which refers to a list of report types which the server 12 will use to format the particular report being produced. &Page is a passed parameter indicating which page of a particular report is being referenced. (Note that, in this present example, all of the available reports would only be one page in length, given the small amount of data provided.) &NAME is a passed parameter indicating the name of the intermediate file 44 (in this example, the intermediate file is named XXXX.DTL), and &DC is a passed parameter indicating the data count (the number of lines of data which pertain to this particular report). Note that in this example, the &DC parameter is set as -1, -1, 3, 2. The value "-1" is used here merely as an indicator that this value is not yet know. As previously discussed herein, in order to produce the menu 66 (FIG. 6) the DTL file 46b (FIG. 4a) was parsed only down to the /DATA entries 58. Since this number of lines of /DATA entries 58 will generally correspond to this parameter value, the first two entries in this example are set to -1. When this information later becomes known (when the DTL file 46a is more fully parsed, as will be discussed in more detail hereinafter) the URL 67 will be updated accordingly.

It is a feature of the inventive navigation method 30a that the URLs 67 are dynamically generated and updated. Since the server/browser relationship does not conventionally provide a state machine (state information), it is necessary to provide necessary information back and forth between the server 12 and the browser 14 by means of parameters of the URL's 67. Essentially all of the URL's 67 discussed herein in relation to the present inventive navigation method 30a will be updated as the user navigates between menu, reports, and other page features as will be discussed hereinafter.

It should be noted that the particular parameter names and value structures discussed above in relation to this example are essentially arbitrary. One skilled in the art will recognize that many different parameter structures could be used to pass the sort of information discussed.

Figure 7:
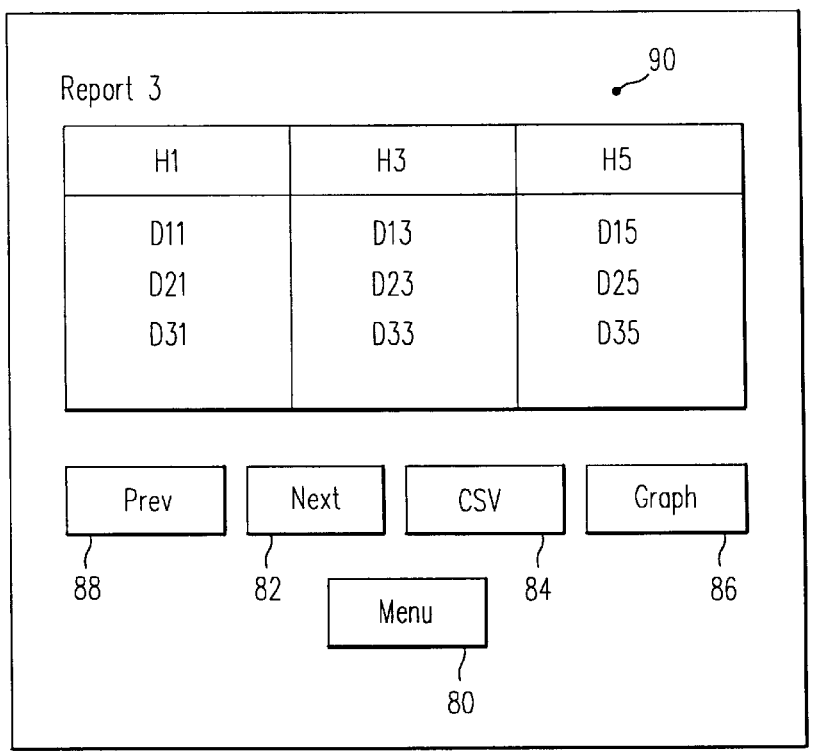
FIGS. 7 and 7a are examples of reports such as might be generated according to the present invention.

FIG. 7 is an example of a report 72 such as might be generated according to this present example when the user has selected Report 3 from the menu 66 (FIG. 6). As can be seen in the example of FIG. 7, the domain headings (H1, H3, H5) appear at the top of columns containing the relevant data, because corresponding report section 50c indicates (in the /DOMAINLABEL1 entry 56a) that this is the appropriate data to include for this report 72.

It will be noted that, in order to produce and send the report 72, the view reports program 60 in the server had to parse the DTL file 46b further than it had to produce the menu 66. According to this present example of the invention, when the view reports program 60 parses the DTL file 46b it will do so on as far as is necessary to get the instantly needed information. Such parse information will then be temporarily stored so that it will not be necessary to reparse the DTL file 46b repeatedly as the user navigates between reports, and the like. When each new request is made from the browser 14 to the server 12 during the course of the navigation method 30a, each time that a user sends a particular URL to "view a page", the view reports program 60 will determine if the needed information is already parsed from the intermediate file 50, parse the intermediate file 50 as necessary, temporarily store the parsed information, build the required web page from the parsed information, with that web page containing updated URLs 67 with the parameters updated according to the newly parsed information and the new page or function being visited.

In the view of FIG. 7 it can be seen that the report 72 has a menu button 80, a next button 82, a CSV button, a graph button 86 and a previous button 88. In this example, the previous button 88 will not be active because this is the first page of the Report3. Also, the next button 82 will not be active because, as discussed previously herein, this particular report has only the one page. The CSV button 84 will have a URL associated therewith which will cause the server 12 to build and send a comma separated variable ("CSV") file which can be input to other programs such as spreadsheet programs. The graph file 86 will cause the server 12 to send appropriately formatted data and will call up a conventional graphing utility to graph the data presently displayed in the report 72. The menu button 80 will return the display to the menu 66 (FIG. 6)

To provide an additional example, if the user were to select the menu button 80, the display would be returned to that of the menu 66 (FIG. 6). As discussed previously herein, the URLs 67 would be updated to reflect any newly parsed information and activity within the system since the last update. If the user were then to select "Report4" from the menu 66, the Report4 report 72a illustrated in FIG. 7a would then be built and sent to the browser 14 as previously described herein in relation to the report 72 of FIG. 7. To continue with this example, the URL 67 for Report 4 would be, at this stage of the method:

htto://viewreports &DT=DTL &POSIX=8, 11, 22, 28 &POS=11 &RDL=RptSw &Page=0 &X_RPT_FILE_NAME=XXX&DC=3,3,3,2

Note that the &POS parameter reflects the line position of Report4, and further that the &DC parameter has been updated with the information gleaned when the DTL file 46b was parsed in the previous operations.

Figure 7A:
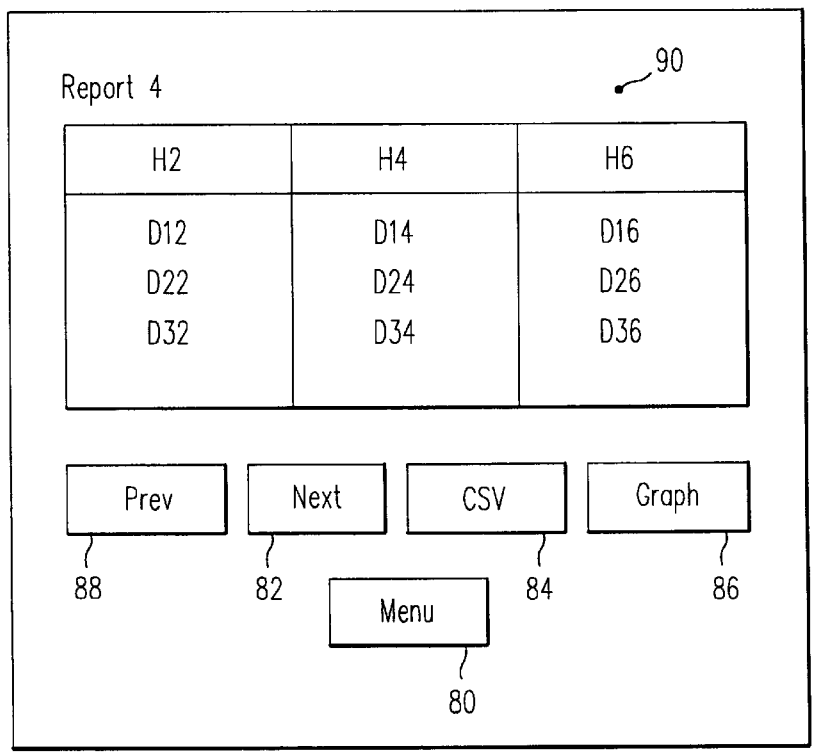

An additional feature that is optionally provided in the navigation method 30a is a drill down button 90 (FIGS. 7 and 7a). The drill down button 90 is provided when there is additional information about a particular portion of data in an intermediate file 46. It is anticipated that this feature will be quite flexible and may be used in many different ways. An example of the sort of data which might be accessed by the drill down button is shown in FIG. 4a. A report subsection 92 contains data essentially in a format alike to one of the intermediate files 46. While the report subsection 92 is shown in this simple example only under one of the /DATA entries 58, it is anticipated that such detailed information will be made available for many, or even all data portions in at least some of the report sections 50.

It should be noted that, herein, the server 12 (FIG. 2) indicates a combination of a computer and software running thereon, and the browser 14 likewise indicates a combination of a computer and software running thereon. Accordingly, both the server 12 and the browser 14 will generally be embodied as computers connected to the internet 16. The computerized operations of the present inventive method 10 may each be embodied in essentially any computer readable medium such that the operations described herein may each be accomplished by transferring the respective data from the computer readable medium to the server 12 computer and/or the browser 14 computer. Similarly, the operations described herein may be physically embodied in computer readable program code which may also be stored on a computer readable medium and transferred therefrom to the server 12, the browser 14, or any such computer.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

Since the report navigation method 30a of the present invention may be readily produced and integrated into existing web servers and web browser systems and devices, and since the advantages as described herein are provided, it is expected that it will be readily accepted in the industry. For these and other reasons, it is expected that the utility and industrial applicability of the invention will be both significant in scope and long lasting in duration.

What is claimed is:

1. A navigation system for navigating between dynamically generated computer reports over the internet, comprising:

browser connected to the internet;

a server connected to the internet;

a first intermediate file which must be parsed completely to obtain data sufficient to create menu;

a second intermediate file from which data sufficient to create the menu can be obtained by partially parsing the second intermediate file; and a report viewing program for, upon demand from the browser, parsing an intermediate file sufficiently to produce a menu and further for sending the menu to the browser over the internet, wherein the menu has associated therewith a plurality of URLs such that the browser can return one of the URLs to the server to request a report from the menu; wherein:

upon receiving one of the URLs from the browser requesting a report, the report viewing program further parses the intermediate file to obtain data sufficient to produce the requested report.

2. The navigation system of claim 1, wherein:

said report viewing program sends the report to the browser, said report including a plurality of navigation buttons.

3. The navigation system of claim 2, wherein:

said report includes a CSV button for requesting a comma separated variable format version of the report.

4. The navigation system of claim 2, wherein:

said report includes a graph button for accessing a graphing utility to graph the report.

5. The navigation system of claim 2, wherein:

each of the navigation buttons has associated therewith a URL; and at least one URL is updated as subsequent reports are sent when additional information is parsed from the intermediate file.

6. The navigation system of claim 1, wherein:

the URLs include state information about the parsing of report data from the intermediate file.

* * * * *